United States Patent [19]

Matthies

[11] Patent Number: 5,020,311

[45] Date of Patent: Jun. 4, 1991

[54] METHOD AND A DEVICE FOR PRODUCING HIGHLY COMPRESSED CYLINDRICAL BALES FROM LOOSE STALK MATERIAL

[75] Inventor: Hans J. Matthies, Braunschweig, Fed. Rep. of Germany

[73] Assignee: Gebrueder Welger GmbH & Co. KG, Wolfenbuettel, Fed. Rep. of Germany

[21] Appl. No.: 430,177

[22] Filed: Nov. 1, 1989

[30] Foreign Application Priority Data

Nov. 2, 1988 [DE] Fed. Rep. of Germany ....... 3837230

[51] Int. Cl.[5] .............................................. A01D 39/00

[52] U.S. Cl. .......................................... 56/432; 100/95

[58] Field of Search .......................... 56/432, 436–438, 56/443, 458–461; 100/89, 95, 98 R, 98 A, 2, 3, 8, 9; 53/135

[56] References Cited

U.S. PATENT DOCUMENTS 3,244,088 4/1966 Bushmeyer et al. .................. 100/95

4,715,175 12/1987 Schaible et al. ...................... 56/432

FOREIGN PATENT DOCUMENTS 1176418 7/1963 Fed. Rep. of Germany .

2443838 4/1976 Fed. Rep. of Germany .

3609631 9/1987 Fed. Rep. of Germany .

*Primary Examiner*—Thuy M. Bui

*Attorney, Agent, or Firm*—Foley & Lardner, Schwartz, Jeffery, Schwaab, Mack, Blumenthal & Evans

[57] ABSTRACT

The invention relates to a method and to a device for producing highly compressed cylindrical bales from loose stalk material, such as hay or straw, which is picked up continuously and is compressed to form a rotating compressed roll which flows continuously in an axial direction. Individual compressed roll sections (bales) are successively cut off from the front end of the compressed roll. For producing dimensionally stable bales of varying length, the compressed roll, which is still subject to radial pressure, is bound automatically by a binder during its axially feeding and before a bale is cut off. The binder is delivered under tension and utilizes the rotation and feed of the compression roll.

20 Claims, 4 Drawing Sheets

METHOD AND A DEVICE FOR PRODUCING HIGHLY COMPRESSED CYLINDRICAL BALES FROM LOOSE STALK MATERIAL

BACKGROUND OF THE INVENTION

1. Field of the Invention

The present invention relates to a method and device for producing highly compressed cylindrical bales from loose stalk material, such as hay or straw, and more particularly, to a method and device for producing bales of varying length.

2. Discussion of the Related Art

Briquetting presses of various forms are well known. A briquette is a volume of stalk material which, when highly compressed, forms a bale. These bales usually have a diameter of 10 to 15 cm and a length corresponding approximately to this diameter. The density of such stalk material briquettes is typically between 350 and 500 kg/m$^3$ and in extreme cases as high as 800 kg/m$^3$.

One such briquetting press is disclosed in U.S. Pat. No. 3,244,088. The rolling space of this press is formed, for example, by six press rollers which can be pivoted with respect to the axis of the rolling space. In addition, the rolling space has a slightly conical design in order to facilitate the emergence of a rotating compressed roll conveyed continuously axially out of the rolling space. The compressed roll emerging from the rolling space is cut by a cutting device, which directly follows the rolling space into individual briquettes whose length may be shorter than their diameter.

A comparable briquetting press can be found in DE-A-1 176 418. In this press, the rolling space is formed by four or five positively driven press rollers which define a conical rolling space. As a result of the conical widening of the rolling space, the rolled up material is continuously pushed out of the winding space under rotation and pressed into a cylinder, where it is braked by adjustable springs. The cylinder and springs rotate in the same direction and with the same speed as the flow of material. Briquettes are then cut to the desired size from the roll of material with the aid of break-off teeth which grip through longitudinal slots of a cylinder jacket. During the cutting operation, the springs serve to hold back the rolled ball remaining in the rolling chamber against the action of the break-off teeth.

DE-A1-3 609 631 discloses an alternative briquetting press, in which cutting blades are successively radially pressed into the compressed roll emerging from the rolling space. These blades protrude radially from a cutting wheel, which is driven by the blades and the feed of the compressed roll, and thereby cut off the bales. With this driving of the cutting wheel, the blades are pressed relatively slowly into the compressed roll, which for this purpose is carried by two pairs of conveying rollers. The conveying rollers thus receive the brunt of the considerable pressure applied by the blades. It is difficult for this pressure to be absorbed by the conveying rollers, since intermediate spaces must necessarily remain between the conveying rollers, so that the stalk material of the compressed roll can be squeezed through. Consequently, this increases the risk that the compressed roll or the briquette will disintegrate.

A common disadvantage to all these briquetting methods and balers is that, as a result of the rotation of the compressed roll and the centrifugal forces consequently acting on the stalk material, and as a result of the cutting forces exerted by the cutting element on the compressed roll, the rolled briquettes become less dense at their surface so that there is a tendency to disintegrate to a large extent during cutting or during the subsequent handling, and are thus of no use to the farmer. To resolve this disadvantage, worldwide developmental work on continuous pick-up briquetting presses or rolling devices having axially emerging compressed rolls, and subsequent cutting devices for these compressed rolls, has been carried out for decades both by science and industry, but has never progressed beyond the trial stage and has finally been abandoned in practice.

So-called large rolling bale presses are to be distinguished from the briquetting presses described above. The former, very widespread presses in practice, produce rolled bales which usually have a diameter of 100 to 150 cm and a dry matter density of only about 100 to 120 kg/m$^3$. Thus, for example, DE-A2-2 443 838 discloses a discontinuous rolling tale press, in which the ready bales situated in the rolling space are bound with a binding means, such as a twine or a web of net or film. By swivelling the rear part of the rolling space housing, the bound bale is removed therefrom. Then, the rolling space is again closed. During the binding and the opening and closing of the rolling space, the machine must be brought to a standstill.

EP-A3-0 268 002 discloses a continuous rolling bale press, wherein the pressing space of conical design is formed by a plurality of press rollers. The pressing space, which is open at the end face of greater diameter and which is to be loaded in the circumferential direction, produces a compressed roll flowing out at the open end face with axial and continuous feed. Thus, the diameter of the compressed roll corresponds to that of conventional rolled bales. Immediately following the pressing space is a cylindrical conveying section, having a wall which is formed by driven conveying rollers arranged with their axes of rotation mutually parallel and together form a conveying channel. The diameter of the conveying channel is approximately the same as that of the compressed roll emerging continuously axially from the pressing space. (Behind the pressing space and in the region of the conveying section, a binding device is provided for binding the compressed roll, which is still subject to radial pressure, during its axial feed. The binding is carried out using a binding means delivered between two of said conveying rollers. Following the binding device is a cutting device, which can be arranged either in the region of the conveying section or immediately following.

SUMMARY OF THE INVENTION

Accordingly, the object of the present invention is to provide a method and device with which bales, that is, highly compressed stalk material briquettes, can be produced which are so dimensionally stable that the length of the produced bales may be a multiple of their diameter.

The foregoing and additional objects are attained by providing a method wherein, for producing dimensionally stable bales with varying length, the compressed roll, which is still subject to radial pressure, is automatically bound during its axial feeding but before a bale is cut off by a binding means delivered under tension and wherein the rotation and feed cf the compressed roll is used to aid the method.

Additionally, an apparatus is provided wherein the rolling space has an approximately uniform diameter over its axial length. Arranged before the cutting device in the end region of the rolling space immediately following the rolling space, is a binding device for binding the compressed roll, which is subject to radial pressure, during its axial feed with a binding means delivered under tension such as twine, band, net or film, made of plastic or other material, for example edible material. Therefore, it is possible to produce with a single rolling unit dimensionally stable bales having a length approximately equal to their diameter (stalk material briquettes) or else is a multiple of their diameter (compact rolls).

It is thus possible to produce a completely new product with the method according to the invention and with the device according to the invention that can be called a compact roll and which is also covered by the term "bale". This is a product which has the high density of the previously known stalk material briquettes, but which can be produced in a length of several meters by virtue of the hitherto unattainable dimensional stability which is surprisingly achieved by the present invention. If the compact rolls are made of ensilageable material, then excellent ensilage can be produced in such a compact roll, as a result of the substantial decomposition of the stalks associated with the pressing and as a result of the density of the compact roll, which is approximately twice that of conventional forage silos. By connecting a preparation device, for example a pair of nip rollers, before the rolling unit, the ensilage quality can be improved still further. By binding the compressed roll with film and by attaching caps, for example made of film or plastic, to both end faces of the bale, it is possible to make automatically produced "miniature silos" in the form of compact rolls. As a result of the high compression density which can be achieved, it is therefore possible to create entirely new methods for harvesting stalk fodder. This leads to substantial reduction of transport and storage space requirements, the ability to transport straw compact rolls great distances for burning and new loss-saving and space-saving hay harvest and ensilage preparation. Longer compact rolls can additionally be used for building purposes, especially in developing countries.

Since the binding of the compressed roll is carried out during its axial feed, a wide range of substantial advantages are obtained. By virtue of the binding of the rolled briquettes or the compact rolls being carried out before they are cut off from the compressed roll, it is no longer possible for the rolls to loosen up or disintegrate during cutting or during the subsequent handling, so that centrifugal forces, and especially the destructive influences occurring during cutting or during the subsequent further processing, are completely eliminated. Moreover, the length of stalk is no longer a limiting factor, whereas in known continuous rolling briquetting presses, the length may not fall below a critical length due to the required inner cohesion of the rolled briquette so that briquetting of rowen, in particular was virtually impossible. In addition, it has not previously been possible for certain types of stalk material, such as straw for example, to be processed at all, whereas according to the present invention dimensionally stable bales can be produced even with this material. Since the bales, moreover, may have a substantially greater diameter than the hitherto known rolled briquettes, a substantially greater output is obtained using the device according to the present invention.

With respect to the present device, it is particularly advantageous to produce on the same machine base highly compressed stalk material briquettes and highly compressed compact rolls of different length. Both possibilities lead to a reduction in the transport and storage space requirement to $\frac{1}{3}$ to $\frac{1}{4}$ of the usual values for rolled bales. Whereas in the case of the discontinuous rolling bale presses it is necessary, for example, to use two rolling units in order to achieve a continuous operation, the machine according to the present invention permits continuous operation with only a single rolling unit. The solution of the present arrangement, using a constant rolling space diameter follows the reverse tendency to that which is conventional in the construction of rolling bale presses. While, according to the invention, the size of the bales can be varied by varying their length, in conventional rolling bale press construction the trend has been to produce rolled bales with a single machine which have diameters of varying size for a constant rolled bale length.

According to the invention it is expedient if a bale is cut off depending on a continuous measurement of the feed of the compressed roll. In this regard, it is advantageous if the feed measurement is used for controlling the binding of the compressed roll.

The compressed roll is preferably bound continuously in helical fashion. It is also preferable that the binding device which is fixed to the frame automatically binds the compressed roll continuously in helical fashion with the binding means through the rotation and the feed of the compressed roll. This provides both a simple construction and a lower requirement for binding means since the individual windings of the binding means may be a corresponding distance from one another, especially when comparatively long stalk material is processed. The advantage in the case where a band is used as binding means, is that the band can be bound at only a slight distance apart with respect to its windings, so that virtually a single-ply covering of the bale is produced.

It is, however, also possible according to the invention for the compressed roll to be bound discontinuously using a binding means whose width covers a substantial part of the length of the bale. The binding means may be, in particular, a net or a film. Since this produces a dense covering of the bale with the binding means, this type of binding is especially suitable for particularly short stalk material.

In order to prevent the binding device from continuing to work unnecessarily when the compressed roll feed fails, it is advantageous if the binding of the compressed roll is interrupted in the event of failure of the compressed roll feed. For this purpose, the binding device can be switched off manually or automatically.

In order for the cutting device to interact harmoniously with the feed of the compressed roll, it is advantageous if the cutting device consists of a retractable cutting element (rotating cutting disk, oscillating cutting blade, double-bladed cutter, chain saw) which is coupled to the compressed roll during the cutting operation in such a way that the cutting device participates in the feed thereof, and it is possible to control the retraction of the cutting device such that it is optionally possible to cut off bales of varying length (stalk material briquettes, compact rolls). As a result of this arrangement of the cutting element with the compressed roll, there is no axial jamming between cutting element and compressed roll. The cutting element cuts into the compressed roll, held dimensionally stable by the binding, and at the same time cuts the binding, whereby, in adhering to the stalk material, the binding over the cut bale is retained.

In order to trigger the cutting device and/or control the binding device, a tripping wheel driven by the feed of the compressed roll may be arranged in the axial plane of the compressed roll. This wheel has star wheels arranged perpendicular to its plane on its circumference, which pick up the rotation of the compressed roll.

According to the present invention, a device can be provided which pivots the press rollers depending on the amount of pressure applied in the rolling space, wherein control preferably is dependent on the drive torque of the press.

For conveying the stalk material briquettes away, it is possible to arrange on the frame of the pick-up baler a detachable elevator or a detachable thrower for conveying the stalk material briquette. These additional members are only necessary if the stalk material briquettes are not to be thrown directly onto the ground. In addition, it is possible to attach to the frame of the pick-up baler a detachable device for collecting, bundling and throwing off a greater number of compact rolls. An additional device of this kind enables larger units to be loaded immediately and driven in.

Further objects and advantages of the present invention will become apparent from the specification and drawings which follows.

DETAILED DESCRIPTION OF THE PREFERRED EMBODIMENTS

Figure 1:
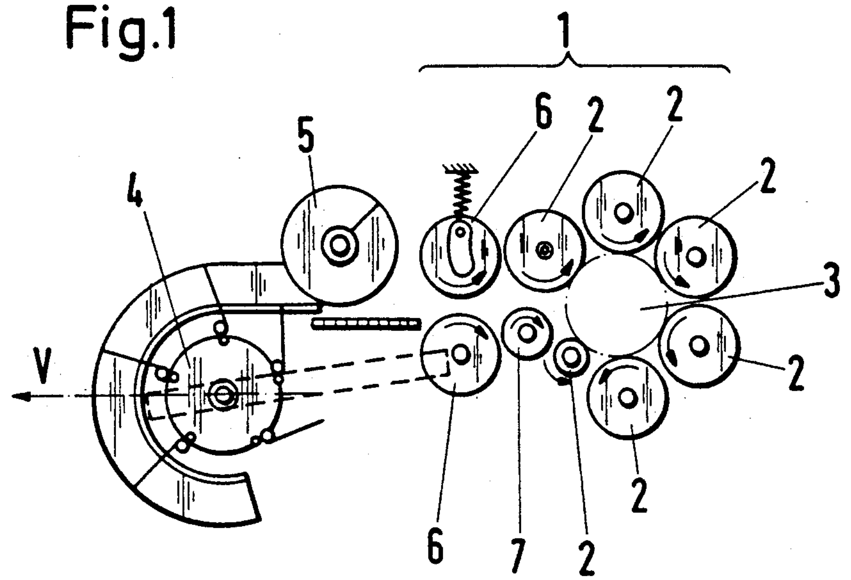
FIG. 1 is a cross-section through elements of a pick-up baler working according to the rolling principle in longitudinal-transverse flux.
Figure 2:
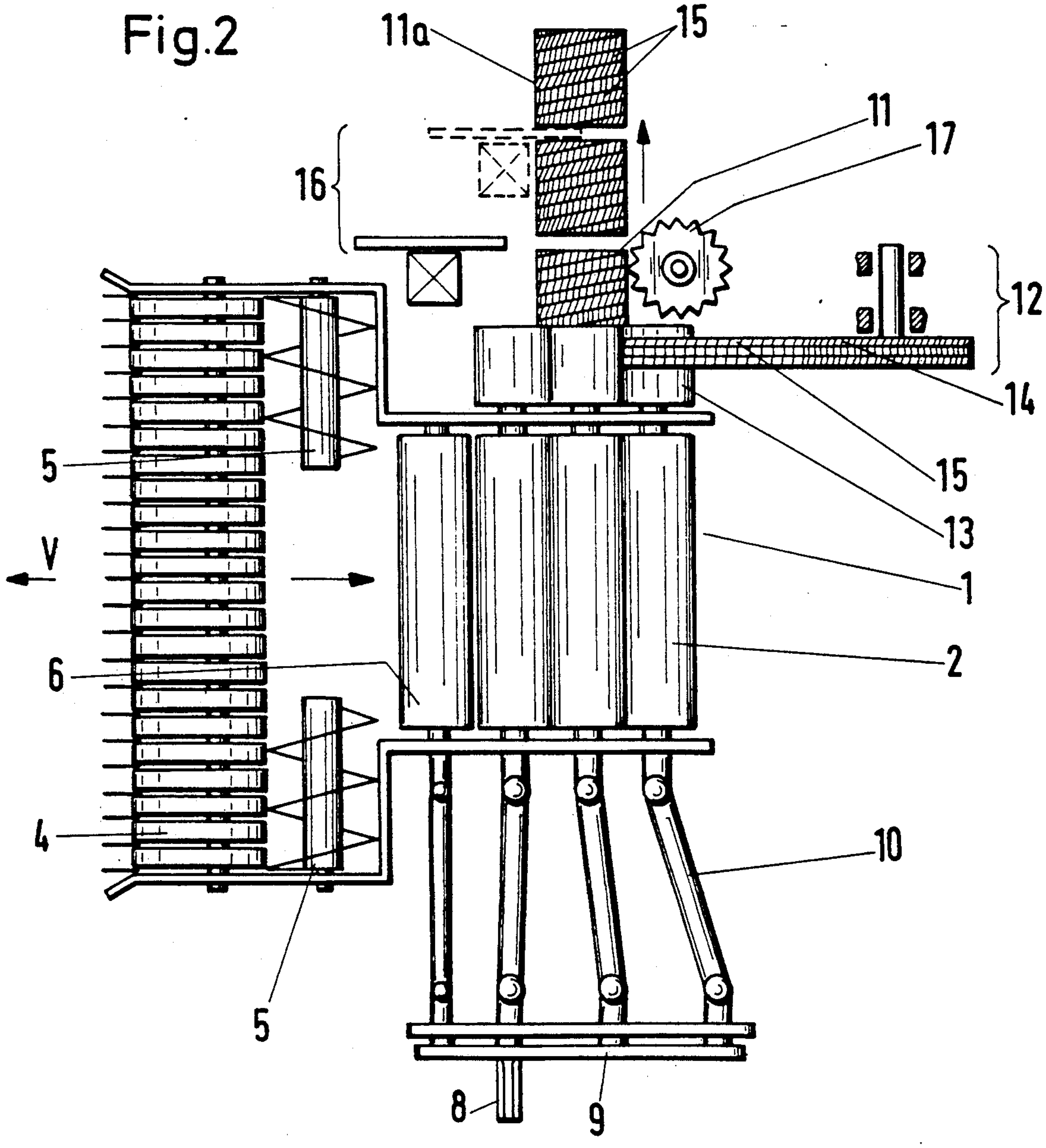
FIG. 2 is a plan view of a pick-up baler working in the longitudinal-transverse flux with a binding device arranged outside the rolling space.
Figure 3:
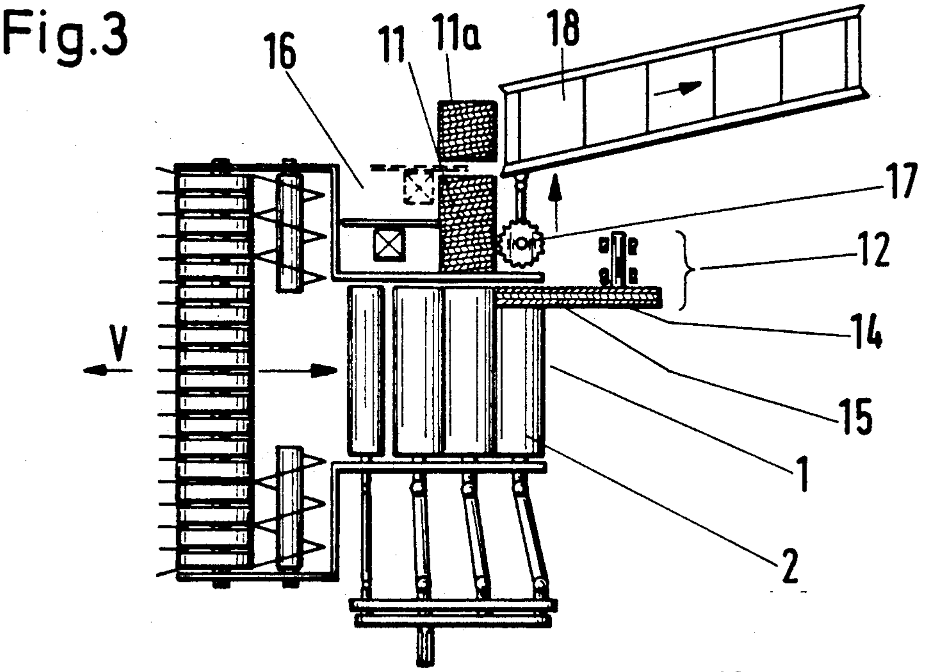
FIG. 3 is a plan view of a pick-up baler working in the longitudinal-transverse flux with a binding device arranged in the last section of the rolling space and having an attached briquette elevator.

The pick-up baler illustrated in the examples of FIGS. 1, 2, and 3 comprises a rolling unit 1 having several press rollers 2, which form a rolling space 3 marked by the dot-dashed circular line. The stalk material picked-up by a pick-up 4 is fed to the rolling space 3 via feed augers 5, a pair of prepressing rollers 6 and feed roller 7.

Since all press rollers 2 must turn in the same direction for forming the compressed roll 11, in contrast to previous devices, there is no press roller of equal size corresponding to the other press rollers 2 arranged behind the lower press roller 6, which would then have a direction of rotation opposite to that of the bottom prepressing roller 6 and would hinder the supply of material. Rather, it has proven expedient to arrange, instead of a press roller 2 of equal size, a feed roller 7 arranged immediately behind the bottom prepressing roller 6 and having the same direction of rotation as the prepressing roller 6. Behind this roller 7 a smaller press roller 2 is arranged having opposite direction of rotation.

Referring now to FIG. 2, the drive of the press rollers 2 is provided by the tractor power take-off via a stub shaft 8, the chain drive 9 and the universal-joint shafts 10. The press rollers 2 are pivoted by a device, not shown in detail here, as a function of the pressure applied in the rolling space out of the paraxial position shown in FIG. 2 in a known manner, so that their axes lie at an oblique angle with respect to the rolling space axis. For reasons of clarity, this pivoting of a few angular degrees is not illustrated. The pivoting is executed by turning the base plate for the press rollers arranged rotatably on one side of the rolling space 3. When the press rollers are pivoted, the stalk material delivered tangentially and compressed in the rolling space 3 is conveyed out of the rolling space axially in the form of a continuously flowing rotating compressed roll 11 (FIG. 2). The compressed roll 11 is thereby taken up by tubes or rolls 42 (FIGS. 6 and 8) arranged on a support fixed to the frame.

According to FIG. 2, the binding device 12 is arranged immediately behind the rolling space 3. The binding device 12 has mechanically driven guide rollers 13 or freely rotating guide rollers 13 driven by the rotating compressed roll 11 (FIG. 2), to which the binding means, a twine or a narrow band 15 of net or film, is delivered from a delivery spool 14. As a result of rotation and feed of the compressed roll 11 which is subject to pressure by the guide rollers 2, the binding means is automatically and continuously wound around the compressed roll 11 in helical fashion. With appropriate selection of the band width, the helical binding can be predetermined depending on the speed and feed of the compressed roll 11, so that the band edges overlap slightly. The compressed roll 11 bound in this manner and emerging from the binding device 12 is then divided up into bales of optional length (11*a* in FIG. 2 or 11*b* in FIG. 4) by a cutting device 16, for example, comprising pivotable rotating cutting disk 33 (FIGS. 6 and 7) which participates in the feed of the compressed roll 11 during the cutting operation. The desired length of the bale is thereby set and measured with the aid of a tripping wheel 17, which will be described in more detail below with regard to FIGS. 6 and 7.

Figure 5:
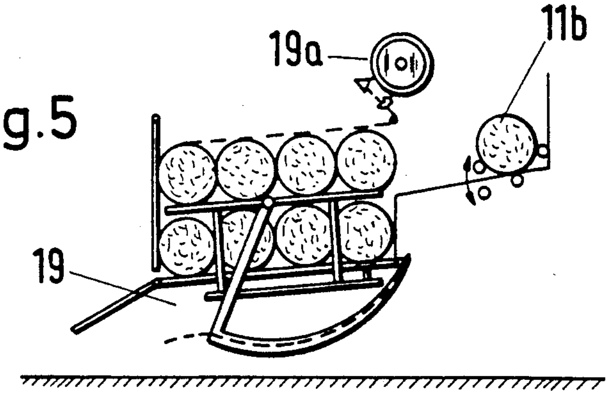
FIG. 5 is a cross-section through the collecting and bundling device.
Figure 4:
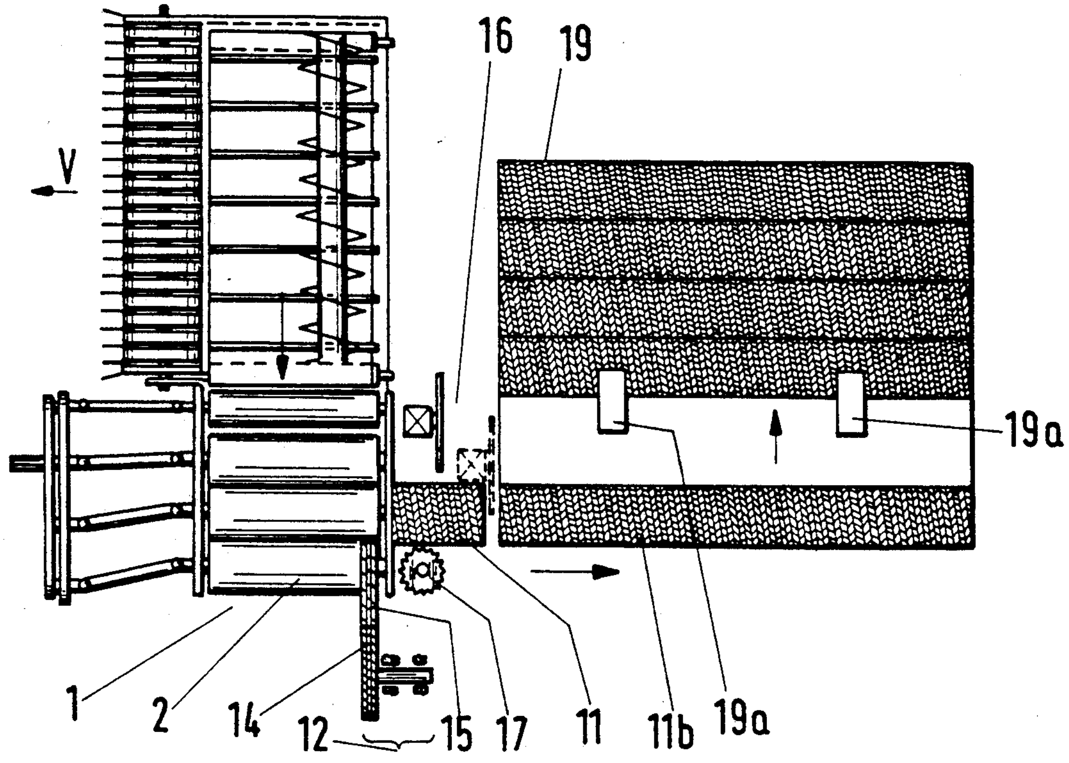
FIG. 4 is a plan view of a pick-up baler working in the transverse-longitudinal flux with an attached compact roll collecting and bundling device.

It is possible in the above described manner to produce—both with the embodiment of the machine according to FIGS. 2 and 3 (longitudinal-transverse flux design) and with the embodiment according to FIG. 4 (transverse-longitudinal flux design)—highly compressed stalk material briquettes 11*a* whose length corresponds approximately to their diameter, or else—with a different setting of the trip wheel 17—compact rolls 11*b* whose length may be a multiple of their diameter (in practice about 1-2 m) with a single rolling unit. The stalk material briquettes 11*a* similar to bulk material may be readily conveyed with an attachable elevator 18 (FIG. 3) or a similar known throwing device onto a cart attached to the pick-up baler. Longer compact rolls 11*b* may be collected and bundled with an attachable device 19, 19*a* (FIGS. 4 and 5) (not described in greater detail) so that the bundle thrown onto the field can be raised and loaded with the front loader. A conventional binding device 19*a* be used, for example, for bundling a plurality of bales.

FIG. 3 shows a pick-up baler in which the binding device 12 is not arranged outside the rolling space, but rather in the last part of the rolling space itself. The guide rollers 13 (FIG. 2) can therefore be omitted. On the other hand, it is possible to make the guide rollers 13 arranged outside the rolling space 3 substantially longer than shown in FIG. 2, and to bind the compressed roll 11 outside the rolling space 3 discontinuously in the manner known for rolling bale presses with a wider binding means 15, such as a net or a film, whose width covers a substantial part of the bale 11*a*, 11*b*. A twine provided with barbs or a narrow band 15 of net or film, for example, is preferably used for binding. With normal, continuous swath pick-up, a binding means 15 of this type automatically and continuously binds the compressed roll 11 without interruption. In the case of short interruptions of the supply of stalk material and thus of the feed of the compressed roll—such as, for example, when driving over gaps in the swath—is not necessary to interrupt the supply of binding means since the slightly greater number of layers of binding occurring at this point on the bale is in no way detrimental and since the resulting additional consumption of binding means 15 is only insignificantly greater. In the case of a longer interruption—such as driving around headlands for example—the band supply is however interrupted by a device which is operated either manually or automatically. The band 15 is again delivered to the compressed roll 11 when the feed of stalk material is renewed by the same device.

Figure 6:
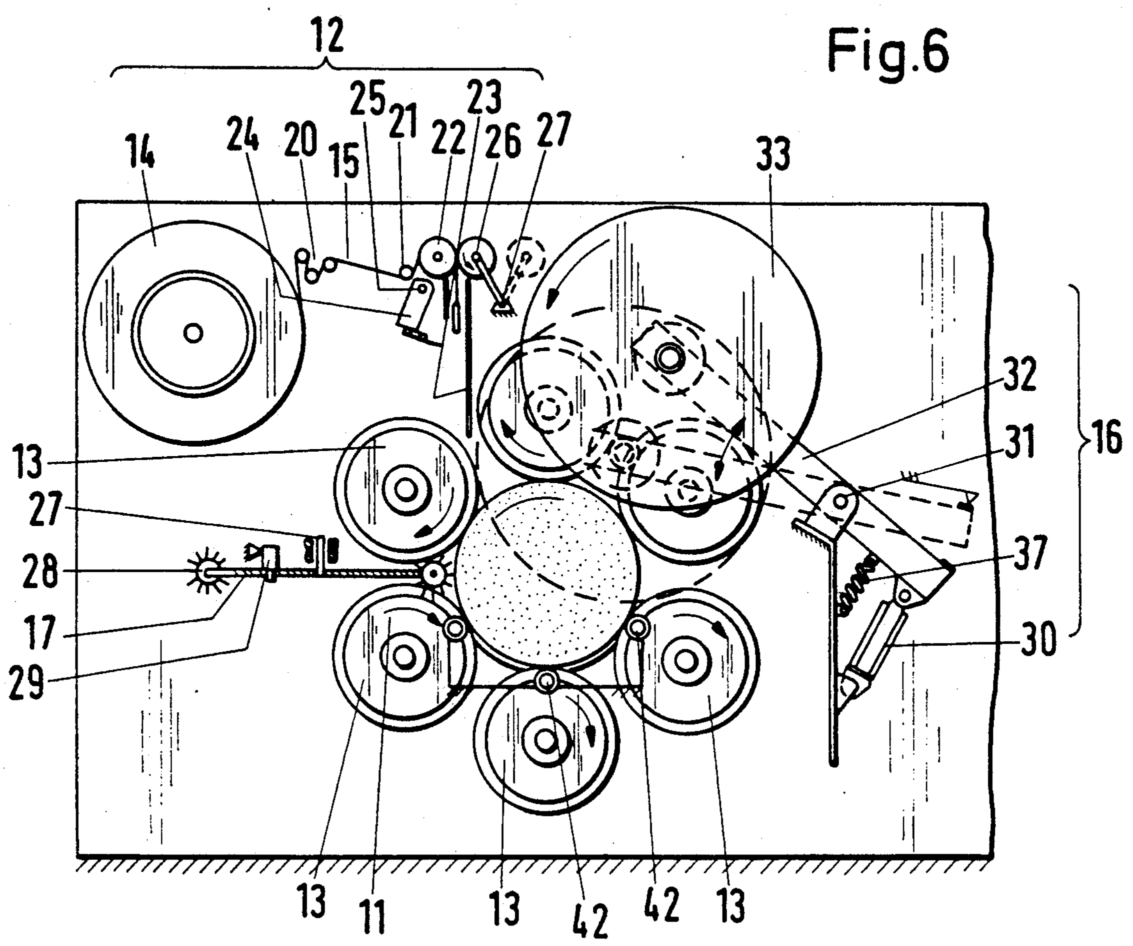
FIG. 6 is a side view of the binding device and the tripping and cutting device.
Figure 7:
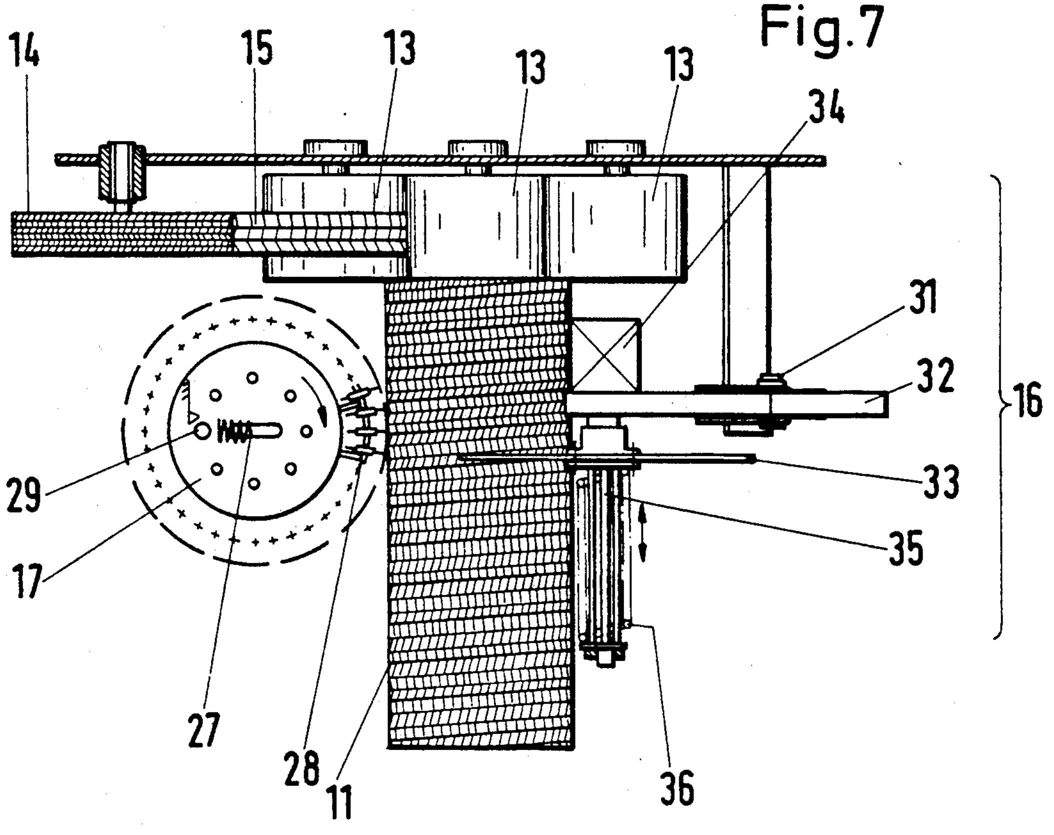
FIG. 7 is a plan view of the binding device and the tripping and cutting device.

The binding device 12 is illustrated together with the cutting device 16 in FIGS. 6 and 7. The binding means 15 is delivered from the delivery spool 14 via braking rollers 20, the feed roller 21 and the driven feed roller 22 into the gap between deflector plate 23 and one of the guide rollers 13. In the case of a longer interruption of the supply of material, that is, when there is no axial feed of the compressed roll 11, a supply of the binding means 15 is interrupted by pivoting impact cutter 24 counter-clockwise about axis 25 and by simultaneously pivoting pressure roller 26 clockwise about axis 27, as shown in phantom in FIG. 6. The impact cutter 24 thereby cuts the part of the binding means 13 enclosing the compressed roll from the end of the binding means delivered from the delivery spool. When the supply of material and compressed roll feed resumes, binding is activated again by pivoting the pressure roller 26 against the feed roller 22 looped by the binding means 15. The impact cutter 24 is simultaneously pivoted back into the position shown in FIG. 6. After the binding means 15 has been fictionally gripped by the compressed roll 11 and guide rollers 13, the binding continues automatically. The pretension of the binding means 13 can be set at the braking rollers 20 in a manner known per se. Commencement and interruption of he binding operation can be controlled in the manner known from conventional rolling bale presses, here not shown, via mechanical or electromagnetic actuation means either manually by the tractor driver or automatically by means of the tripping wheel 17.

The cutting device 16 is triggered by the tripping wheel 17. The shown embodiment comprises a disk which is freely rotatable about an axis 27, and on the periphery of which are arranged star wheels 28 which are rotatable perpendicular to the plane of the disk. These star wheels 28 engage positively with the compressed roll 11 and pick up its rotational motion. As a result of the compressed roll feed, the tripping wheel 17 is turned about axis 27, the respective angle of rotation being a measure of the length of the feed of the compressed roll 11. By attaching, for example, trip cams 29 to various points of its circumference, the triggering time and hence the bale length can be varied. In addition, the tripping wheel 17 can be used to switch the binding device 12 on and off automatically. As a rule, however, it is sufficient to switch it off and on manually with an electric switch from the tractor seat. The trip cams 29 operate a switch, which in turn activates the oil supply to the pivoting cylinder 30 of the cutting device 16 via a hydraulic system not shown here.

The cutting device 16 comprises a lever arm 32 pivotable about an axis 31. The pivoting cylinder 30 is arranged on one end of the lever arm 32 and the hydraulically driven continuously rotating cutting disk 33 is arranged on its other end. When the pivoting cylinder 30 is activated, the cutting operation begins upon contact of the rotating cutting disk 33 with the rotating compressed roll 11, which has been bound and hence, stabilized. As a result of the adhesion of the binding means to the pressed roll, the binding remains even after cutting. Once the cutting disk 33 has pivoted so far that the disk circumference has reached approximately the compressed roll axis, the cutting operation is finished. The cutting disk 33 is arranged slidably on a splined shaft 35 mounted in the lever 32 and driven by an hydraulic motor 34, so that during the cutting operation it is coupled to the compressed roll 11 and participates in its feed motion. After completion of the cutting operation, the pivoting cylinder 30 is unloaded by the hydraulic system so that a compression spring 37 pivots the pivot arm 32 with the cutting disk 33 into the initial position illustrated in FIG. 6. The cutting disk 33 is then returned by the force of a compression spring 36 into its initial position on the splined shaft 35 illustrated in FIG. 7.

Figure 9:
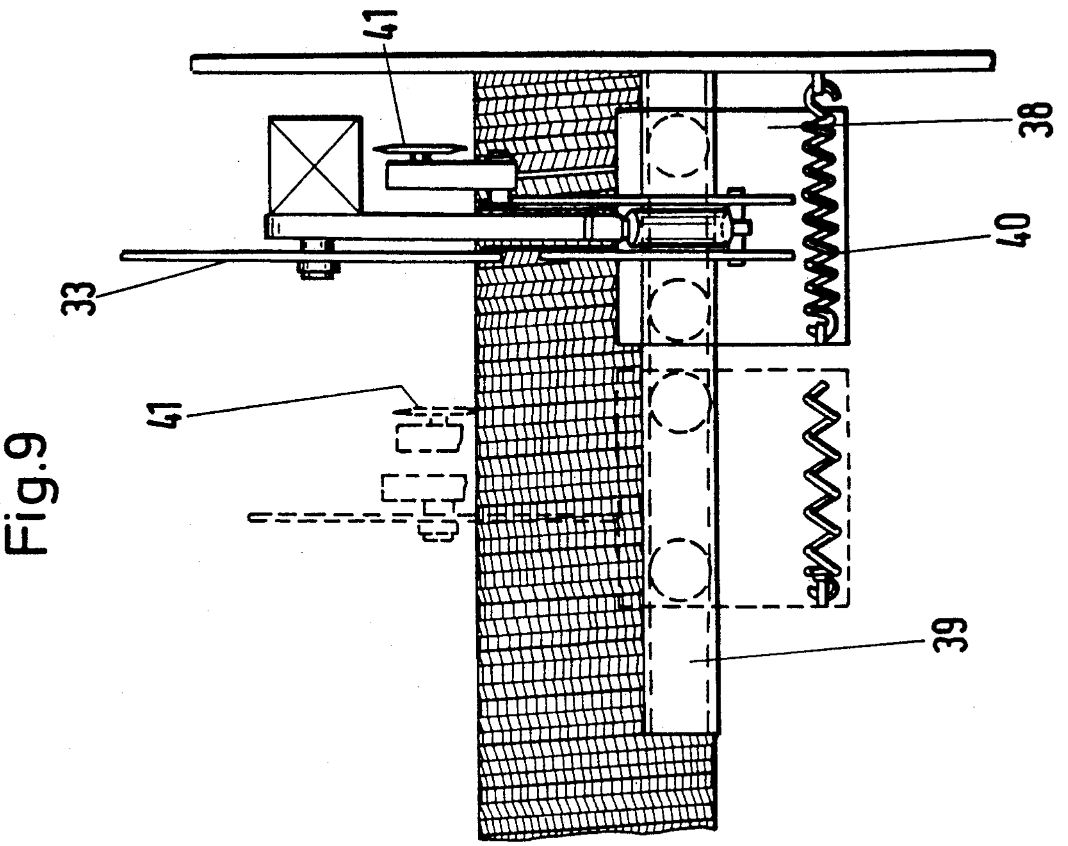
FIG. 9 is a side view of the alternative cutting device.
Figure 8:
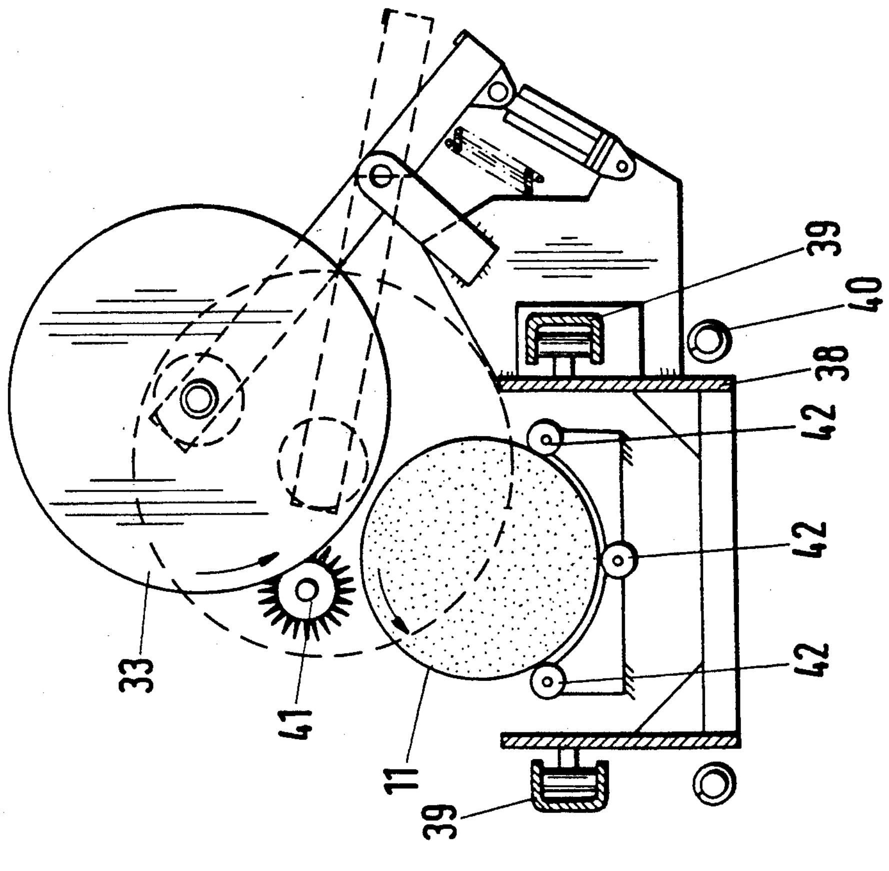
FIG. 8 is a cross-section through an alternative embodiment of the cutting device.

An alternative embodiment for the design of the cutting device 16 is to arrange the entire cutting device, including its drive, separate from the rolling space housing and to control it so that the cutting device 16 is coupled to the compressed roll 11 during the cutting operation and thus participates in the feed of the compressed roll 11. As shown in FIGS. 8 and 9, the cutting device 16 is mounted in this case on a carriage 38 which can be driven in two U-irons 39 of the machine frame in the feed direction of the compressed roll. The carriage 38 is held in the idle position by two compression springs 40 or a hydraulic cylinder (not shown). After triggering the cutting operation, the cutting disk 33 engages with the compressed roll 11 so that the carriage 38 participates in the feed motion of the compressed roll as the compression springs 40 are gradually tensioned. After the cutting operation is completed, the cutting disk 33 releases the compressed roll 11 so that the carriage 38 is pulled back by the springs 40 into its idle position again. For a reliable coupling of the cutting device 16 to the compressed roll 11, and for relieving the load on the cutting disk 33, it is possible to provide additionally on the carriage 38, for example, a retractable and rotating driving wheel 41 controlled by a cam disk, which engages with the compressed roll at the same time as the cutting disk 33 and provides for the reliable entrainment of the entire cutting device. The driving wheel 41 is only indicated in FIGS. 8 and 9.

It should become obvious to those skilled in the art that the present invention is not limited to the preferred embodiments shown and described.

What is claimed is:

1. A method for producing highly compressed cylindrical bales from loose stalk material, comprising:
picking up loose stalk material;
forming a cylindrical roll by compressing and rotating the loose stalk material;
feeding the rotating compressed roll in an axial direction thereof;
binding at least a portion of the rotating compressed roll, while the roll is being axially fed and is subject to radial pressure; and
cutting a bound portion of the roll to produce a dimensionally stable bale of a desired length.

2. The method according to claim 1, further comprising delivering a binder under tension to bind the roll.

3. The method according to claim 1, further comprising continuously measuring the feed of the roll to determine where a cut is to be made.

4. The method according to claim 3, further comprising continuously measuring the feed of the roll to control the binding of the compressed roll.

5. The method according to claim 4, wherein the binding is helical.

6. The method according to claim 1, wherein the binding is performed discontinuously using a binder having a width covering substantially the length of the formed bale.

7. The method according to claim 1, further comprising interrupting the binding if feeding of the compressed roll fails.

8. The method according to claim 1, wherein said steps of picking up loose stalk material, forming a cylindrical roll, feeding the rotating compressed roll, binding at least a portion of the rotating compressed roll, and cutting a bound portion of the roll produce a cylindrical bale.

9. A rolling principle baler for producing highly compressed cylindrical bales from loose stalk material, comprising:
means for producing a compressed roll, said producing means defining a cylindrical rolling space therein;
the rolling space being open at an end face thereof and adapted to be loaded in a circumferential direction;
means for introducing loose stalk material into the rolling space;
means for rotating the compressed roll;
means for subjecting the compressed roll to radial pressure;
means for feeding the rotating compressed roll along an axis of the rolling space;
means for binding at least a portion of the rotating compressed roll, while the roll is being fed and is subject to radial pressure; and
means for cutting a bound portion of the roll to produce a dimensionally stable bale of a desired length.

10. The baler according to claim 9, wherein said producing means comprises a plurality of pivotable press rollers disposed circumferentially about the cylindrical rolling space.

11. The baler according to claim 10, wherein the press rollers pivot in relation to the amount of pressure applied in the rolling spaces.

12. The baler according to claim 9, wherein the binding means binds the roll discontinuously with a net having a length which covers a substantial part of the length of the bale.

13. The baler according to claim 9, further comprising means for switching off the binding means if the feeding means fails.

14. The baler according to claim 9 wherein the cutting means comprises:
a retractable cutting element which engages the compressed roll during cutting to aid in the feeding of the roll; and
means for controlling retraction of the cutting element to produce bales of a desired length.

15. The baler according to claim 9, further comprising means for measuring the feed length of the compressed roll.

16. The baler according to claim 15, further comprising means, cooperating with the measuring means, for triggering the cutting means.

17. The baler according to claim 15, further comprising means, cooperating with the measuring means, for controlling the binding means.

18. The baler according to claim 15, wherein the measuring means comprises:
a tripping wheel driven by the feed of the compressed roll and arranged in an axial plane thereof; and
a plurality of star wheels arranged on the circumference of the tripping wheel perpendicular to the plane of the tripping wheel;
said star wheels being adapted to be rotated by the rotation of the compressed roll.

19. The baler according to claim 9, wherein the binding means binds the roll helically due to the rotation and feed of the roll.

20. A cylindrical bale produced by a process comprising the steps of:
picking up loose stalk material;
forming a cylindrical roll by compressing and rotating the loose stalk material;
feeding the rotating compressed roll in an axial direction thereof;
binding at least a portion of the rotating compressed roll, while the roll is being axially fed and is subject to radial pressure; and
cutting a bound portion of the roll to produce a highly compressed dimensionally stable bale of a desired length.

* * * * *